US011457507B2

(12) United States Patent
Knoop et al.

(10) Patent No.: US 11,457,507 B2
(45) Date of Patent: Sep. 27, 2022

(54) COMMUNICATION SYSTEM FOR SERIAL COMMUNICATION BETWEEN COMMUNICATION DEVICES

(71) Applicant: Phoenix Contact GmbH & Co. KG, Blomberg (DE)

(72) Inventors: Daniel Knoop, Paderborn (DE); Irene Berthold, Soest (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 445 days.

(21) Appl. No.: 16/500,751

(22) PCT Filed: Apr. 6, 2018

(86) PCT No.: PCT/EP2018/000165
§ 371 (c)(1),
(2) Date: Oct. 3, 2019

(87) PCT Pub. No.: WO2018/188779
PCT Pub. Date: Oct. 18, 2018

(65) Prior Publication Data
US 2020/0084834 A1      Mar. 12, 2020

(30) Foreign Application Priority Data

Apr. 10, 2017   (BE) .................................. 2017/5248

(51) Int. Cl.
*H04W 84/20* (2009.01)
*G06F 11/10* (2006.01)
(Continued)

(52) U.S. Cl.
CPC ......... *H04W 84/20* (2013.01); *G06F 11/1004* (2013.01); *H04L 1/0061* (2013.01);
(Continued)

(58) Field of Classification Search
CPC .. H04W 84/20; G06F 11/1004; H04L 1/0061; H04L 12/403; H04L 61/2038; H04L 61/6095
(Continued)

(56) References Cited

U.S. PATENT DOCUMENTS 4,321,666 A * 3/1982 Tasar .................... G06F 11/188
714/10
4,638,313 A * 1/1987 Sherwood, Jr .......... H04L 29/06
711/E12.086

(Continued)

FOREIGN PATENT DOCUMENTS

CN        102694875 A       9/2012
EP        2 503 763 A1      9/2012
(Continued)

OTHER PUBLICATIONS

LIN Specification Package Revision 2.2A; www.vector.com; www.lin-subbus.org; Dec. 31, 2010; 194 pgs. LIN Consortium, 2010.

*Primary Examiner* — Paul R. Myers
(74) *Attorney, Agent, or Firm* — Holland & Hart LLP

(57) ABSTRACT

The present disclosure relates to a communication system for serial communication. The communication system may include a master communication device; and at least one slave communication device comprising a unique identifier, wherein the master communication device is connected to the at least one slave communication device via a signal line configured for communications, wherein the master communication device is configured to read at least a part of the unique identifier via the signal line, and assign an address to the at least one slave communication device based at least in part on the unique identifier, and transmit the address to the at least one slave communication device via the signal line.

19 Claims, 4 Drawing Sheets

(51) Int. Cl.
    *H04L 1/00*              (2006.01)
    *H04L 12/403*         (2006.01)
    *H04L 61/5038*       (2022.01)
    *H04L 12/40*          (2006.01)
    *H04L 101/695*      (2022.01)

(52) U.S. Cl.
    CPC ........ H04L 12/403 (2013.01); H04L 61/5038 (2022.05); *H04L 2012/40234* (2013.01); *H04L 2101/695* (2022.05)

(58) Field of Classification Search
    USPC ........................................................ 710/110
    See application file for complete search history.

(56) References Cited

U.S. PATENT DOCUMENTS

| | | | | |
|---|---|---|---|---|
| 4,660,141 A * | 4/1987 | Ceccon | ............... | G06F 12/0676 |
| | | | | 711/E12.088 |
| 5,177,622 A * | 1/1993 | Yoshida | ............... | H04N 1/4105 |
| | | | | 382/245 |
| 5,666,542 A * | 9/1997 | Katai | ......................... | G06T 1/00 |
| | | | | 715/201 |
| 5,850,565 A * | 12/1998 | Wightman | .......... | H03M 7/3084 |
| | | | | 710/1 |
| 5,890,183 A * | 3/1999 | Fujimoto | ................. | G06F 40/10 |
| | | | | 715/236 |
| 5,974,475 A * | 10/1999 | Day | .................... | G06F 12/0661 |
| | | | | 711/E12.086 |
| 6,041,425 A * | 3/2000 | Kokunishi | .......... | G06F 11/1435 |
| | | | | 714/37 |
| 6,105,022 A * | 8/2000 | Takahashi | ............... | G06F 16/30 |
| | | | | 707/999.102 |
| 7,755,505 B2 * | 7/2010 | Johnson | ................. | H05B 47/19 |
| | | | | 340/10.52 |
| 8,055,779 B1 * | 11/2011 | Cheng | .............. | H04N 21/47202 |
| | | | | 709/227 |
| 8,232,869 B2 * | 7/2012 | Bennett | ............... | H04L 61/2038 |
| | | | | 710/110 |
| 9,350,823 B2 * | 5/2016 | Rosewell | ................ | G06F 16/31 |
| 2003/0158857 A1 * | 8/2003 | Weng | ..................... | G06Q 10/08 |
| 2004/0165534 A1 * | 8/2004 | Claseman | ............ | H04L 1/1607 |
| | | | | 370/241.1 |
| 2004/0255205 A1 * | 12/2004 | Oodate | .................. | G11C 16/20 |
| | | | | 714/54 |
| 2005/0030959 A1 * | 2/2005 | Kunze | ............... | H04L 29/12924 |
| | | | | 370/401 |
| 2006/0015595 A1 * | 1/2006 | Shantala | ............. | H04L 61/5014 |
| | | | | 709/222 |
| 2007/0291887 A1 * | 12/2007 | Ishimoto | ................. | H04L 25/40 |
| | | | | 375/371 |
| 2008/0065474 A1 * | 3/2008 | Sharma | .................. | G06Q 30/02 |
| | | | | 705/12 |
| 2008/0071781 A1 * | 3/2008 | Ninan | ............... | G06F 16/90344 |
| 2009/0007155 A1 * | 1/2009 | Jones | .................. | H04L 61/6031 |
| | | | | 719/327 |
| 2009/0200386 A1 * | 8/2009 | Longacre, Jr. | ... | G06K 19/06037 |
| | | | | 235/494 |
| 2009/0325635 A1 * | 12/2009 | Gass | ..................... | H04W 48/18 |
| | | | | 455/552.1 |
| 2011/0252074 A1 * | 10/2011 | Fujita | .................... | G06F 16/211 |
| | | | | 707/812 |
| 2015/0373224 A1 * | 12/2015 | Kusakabe | .......... | H04N 1/00413 |
| | | | | 358/1.15 |
| 2017/0294092 A1 * | 10/2017 | Farley | .................... | G08B 17/00 |
| 2018/0007197 A1 * | 1/2018 | Giatilis | ............. | H04M 3/42059 |
| 2019/0027250 A1 * | 1/2019 | Pulitzer | .................. | G16H 10/40 |

FOREIGN PATENT DOCUMENTS

| | | |
|---|---|---|
| WO | WO 2005/051723 A1 | 6/2005 |
| WO | WO 2009/010745 A1 | 1/2009 |

* cited by examiner

COMMUNICATION SYSTEM FOR SERIAL COMMUNICATION BETWEEN COMMUNICATION DEVICES

CROSS-REFERENCES TO RELATED APPLICATIONS

This application is a 371 national phase entry of International Patent Application No. PCT/EP2018/000165, entitled "COMMUNICATION SYSTEM FOR SERIAL COMMUNICATION BETWEEN COMMUNICATION DEVICES," filed 6 Apr. 2018, which claims priority to Belgian Patent Application No. BE2017/5248, entitled "KOMMUNIKATIONSSYSTEM ZUR SERIELLEN KOMMUNIKATION ZWISCHEN KOMMUNIKATIONSGERÄTEN, filed 10 Apr. 2017. Each of these applications is incorporated herein by reference.

TECHNICAL FIELD

The present disclosure relates to a communication system for serial communication between communication devices, in particular, for addressing communication devices.

BACKGROUND

Communication devices which form a communication system with a common communication line are typically addressed, so that messages can be sent between the communication devices in a targeted manner via the common communication line. This address is usually unique and can be specified by one of the communication devices or assigned during operation of the communication system. For an address assignment during operation of the communication system, one specific communication device, for example, is configured to control the address assignment.

SUMMARY

The object of the present disclosure is to provide an efficient communication system that carries out an address assignment during operation of the communication system.

This object is achieved by the features of the independent claims. Advantageous examples are the subject matter of the dependent claims, the description and the accompanying figures.

The present disclosure is based on the understanding that, in order to unambiguously assign an address to a communication device in a communication ork, a unique identifier of the communication device can at least partially be read.

According to a first aspect, the disclosure relates to a communication system for serial communication between a master communication device and at least one slave communication device, wherein the master communication device and the at least one slave communication device are connected to one another for communicating via a signal line, wherein the at least one slave communication device has a unique identifier, characterised in that the master communication device is configured to read at least a part of the unique identifier via the signal line and, on the basis of at least a part of the unique identifier, assign an address to the at least one slave communication device and transmit said address to the slave communication device via the signal line.

An assignment of an address to a slave communication device in a communication system, in particular a Local Interconnect Network (LIN), can be implemented manually, for example by setting a DIP switch, by hard wiring or by one-time programming (OTP) in the slave communication devices. Consequently, the assignment of an address can require manual intervention in the start-up or maintenance of the communication system.

When replacing a first slave communication device with a replacement communication device in a manually-configured communication system, it may be necessary for the replacement communication device to have the same address as the first communication device. Therefore, in order to realise the unique address assignment in the communication system, it may be necessary to have identical communication devices with different addresses available for the replacement when replacing the slave communication device.

The address assignment according to the disclosure provides the advantage that no manual intervention is necessary for address assignment and/or that, after the replacement of a slave communication device in the communication network, the address assignment can again be realised automatically. This allows both the manufacturing and the maintenance costs to advantageously be reduced.

In one example, the communication system is a Local Interconnect Network (LIN), wherein the signal line is configured as a single wire, and the master communication device and the slave communication device are bidirectionally connected to one another via the signal line.

The respective addresses of the slave communication devices in the communication system, in particular the UN system, can he a Local Interconnect Network Identification (LIN ID).

An automatic assignment of an address to a slave communication device can be realised using a Slave Node Position Detection (SNPD) method. Such a method can be a Bus Shunt Method (BSM), for example, or a connection of the communication devices to an additional signal line, for example via an Extra Wire Daisy Chain (XWDC). Both a BSM and a XWDC method can require additional hardware expenditure and/or additional signal lines. The communication system according to the disclosure realises an automatic addressing without additional hardware expenditure, in particular with respect to the LIN specification, without additional circuits or signal lines.

Both a BSM and a XWDC can also require at least one additional signal access in the slave communication devices, whereby further additional circuits may be necessary in the slave communication devices for a BSM.

A limited number of slave and/or master communication devices can be connected in the communication system, so that the number of unique identifiers that can be realised in the communication system is limited as well. As a result, a unique identification and subsequent address assignment to a slave or master communication device can already be realised with a subset of characters of the string of the unique identifier.

In one example, the communication system is a LIN system which realises the communication between an uninterruptible power supply device (UPS) and a plurality of energy storage modules. The master communication device can be the UPS and the at least one slave communication device can he formed by the plurality of energy storage modules.

In one example, the unique identifier is a string consisting of a plurality of characters, wherein the master communication device is configured to query a particular character of the plurality of characters at a specific position of the string by sending a query message to the at least one slave communication device via the signal line.

The unique identifier of the slave communication devices can be a serial number of the respective slave communication devices, for example. In one example, the serial number is a 64-bit binary string. The uniqueness of the unique identifier, in particular the serial number, can ensure that an identification of the respective slave communication devices by the master communication device is unique. A unique addressing of the slave communication devices, for example by the master communication device, can thus advantageously be realised.

In one example, the at least one slave communication device is configured to process the query message of the master communication device and confirm that the specific character is present at the specific position in the string of the unique identifier of the slave communication device by sending a response message via the signal line.

In one example, the communication system comprises a plurality of slave communication devices and, based on the response message received by the master communication device, the master communication device is configured to determine whether a single slave communication device or no slave communication device or more than one slave communication device of the plurality of slave communication devices has sent a response message.

In one example, the at least one slave communication device has a first operating state, in which said at least one slave communication device is configured to send the response message to the master communication device in response to receiving the query message from the master communication device.

In the first operating state, at least one slave communication device is not assigned an address, for example, in particular no network address.

In one example, in addition to the first operating state, the at least one slave communication device has a second operating state, in particular a quiet mode. In the second operating state, the at least one slave communication device is configured to refrain from sending a response message to the master communication device in response to receiving the query message from the master communication device. In the second operating state, the at least one slave communication device is not assigned an address, for example, in particular no network address.

In one example, in addition to the first operating state and the second operating state, the at least one slave communication device has a third operating state, in which an address is assigned to the at least one slave communication device. In the third operating state, the at least one slave communication device is configured to refrain from sending a response message to the master communication device in response to receiving the query message from the master communication device.

In one example, the at least one slave communication device has a first operating state, a second operating state and a third operating state and, in the first operating state, in particular only in the first operating state, is configured to send the response message in response to the query message of the master communication device and, in the second and in the third operating state, not send a response message, or refrain from sending the response message, in response to the query message of the master communication device, wherein, in the third operating state, an address is assigned to the at least one slave communication device.

In one example, the master communication device is configured to move the at least one slave communication device to the first operating state, the second operating state or the third operating state by sending a status message via the signal line.

If the at least one slave communication device is moved to the first operating state, said at least one slave communication device can be moved to the second operating state by receiving the status message. If the at least one slave communication device is moved to the second operating state, said at least one slave communication device can be moved from the second operating state to the first operating state by receiving the status message.

In one example, the master communication device is configured to trigger a restart of the at least one slave communication device by sending a restart message via the signal line, wherein the address in the at least one slave communication device is deleted by the restart and the at least one slave communication device is moved from the third operating state to the first operating state.

The address field of a received message, in particular a query, response, status message or restart message, which includes an address and/or other data, is read by the master and/or the slave communication devices before any further content of the message is processed. This makes it possible for the contents of the address field to be used to initiate asynchronous, global services directed toward all of the master and/or slave communication devices. One example of such a service is a global restart (reset) of the master and/or slave communication devices, whereby all of the master and/or slave communication devices of the communication system are moved to a state that corresponds to a state of the master and/or the slave communication devices after said master and/or slave communication devices are first switched on.

Another global service is the querying of a specific character at a specific position of the string of the unique identifier of the master acid/or the slave communication devices.

In one example, the unique identifier is an unchangeable binary identifier.

The reading of the unique identifier of the at least one slave communication device by the master communication device can, for example, be realised by querying the same character at different positions. If the unique identifier is realised as a binary string, the query can, for example, check whether a 1 is present at a specific position of the unique identifier. In subsequent queries, the specific position can be shifted by one position in the character string. A service, which checks for a zero at a specific position of the unique identifier, can be realised as well.

According to a second aspect, the disclosure relates to a method for serial communication between a master communication device and at least one slave communication device, wherein the master communication device and the at least one slave communication device are connected to one another for communicating via a signal line, wherein the at least one slave communication device has a unique identifier, comprising reading at least a part of the unique identifier via the signal line, assigning an address to the at least one slave communication device on the basis of at least a part of the unique identifier, and transmitting said address to the slave communication device via the signal line.

In one example, the method further comprises: Sending of a restart message by the master communication device to the at least one slave communication device via the signal line, so that the address assigned to the at least one slave communication device is deleted and the at least one slave communication device is moved from the third operating state to the first operating state.

If the at least one slave communication device is moved to the second operating state, said at least one slave communication device can be moved from the second operating state to the first operating state by receiving the restart message.

In one example, the method further comprises: Sending of a query message by the master communication device to the at least one slave communication device via the signal line, which includes a character and the query position of said character in the character string of the unique identifier;

Sending of a response message by the at least one slave communication device to the master communication device via the signal line, if the received character matches the character of the unique identifier at the received query position in the character string of the unique identifier;

Sending of a status message by the master communication device via the signal line to all of the slave communication devices that did not send a response message to the query message, wherein the status message causes said slave communication devices to go into sleep mode and no longer respond to messages from the master communication device;

Repeating the above-mentioned method steps with another character at another query position, until only one single slave communication device or no slave communication device sends a response message to the master communication device;

Determining by the master communication device that, after a predetermined time has elapsed, no slave communication device has sent a response message, so that, without sending the restart message, the above-mentioned method steps are repeated with another character at another position in the character string as long as not all the positions of the character string have been queried;

Assigning of an address by the master communication device to the slave communication device if only this one slave communication device responds, wherein said slave communication device is moved to the third operating state and does not take part in the further method and is optionally moved to the third operating state;

Repeating the above-mentioned method steps without deleting the assigned addresses and without the participation of those slave communication devices that have already been assigned an address, until an address has been assigned to each one of the slave communication devices.

In one example, the method further comprises terminating the method if all positions have been queried, and, in particular during the query, no slave communication device has responded, because all of the slave communication devices have been assigned an address and all of the slave communication devices have been moved to the third operating state.

In one example, all the messages are transmitted digitally and include 8 bytes of useful data and a 1 byte checksum.

In one example, the master communication device is configured to determine whether one slave communication device or a plurality of slave communication devices have sent a response message on the basis of the checksum.

According to a third aspect, the disclosure relates to a computer program having a program code for executing the above-mentioned method when the program code is executed on a processor.

BRIEF DESCRIPTION OF THE DRAWINGS

Further examples of the principles of the present disclosure will now be explained with reference to the accompanying figures.

DETAILED DESCRIPTION

Figure 1:
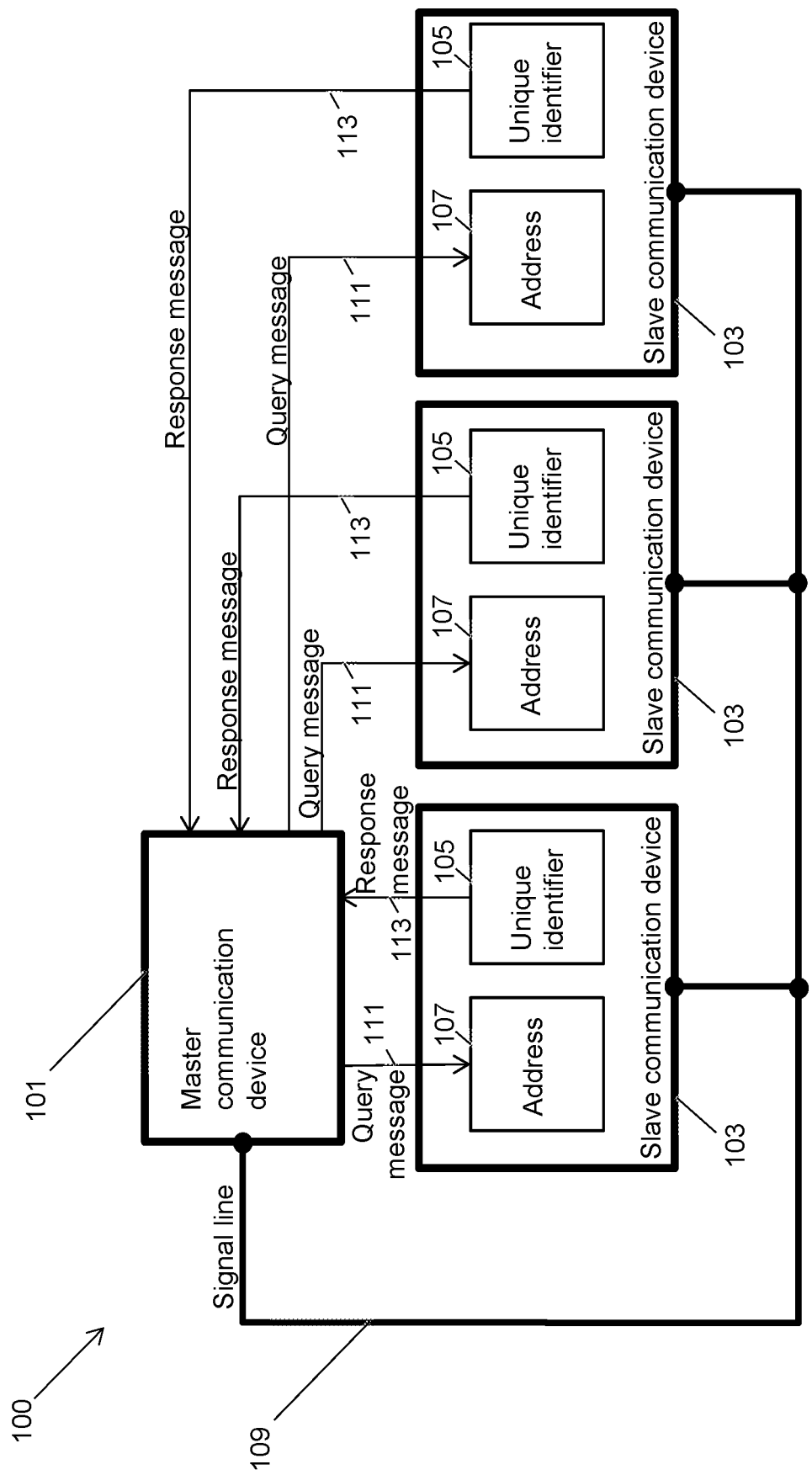
FIG. 1 shows a communication system according to an example.

FIG. 1 shows a schematic illustration of a communication system 100 for serial communication between the master communication device 101 and the at least one slave communication device 103, wherein the master communication device 101 and the at least one slave communication device 103 are connected to one another for communicating via a signal line 109, wherein the at least one slave communication device 103 has a unique identifier 105. Three slave communication devices 103 are shown as an example in FIG. 1. The master communication device 101 is configured to read at least a part of the unique identifier 105 via the signal line 109 and, on the basis of at least a part of the unique identifier 105, assign an address 107 to the at least one slave communication device 103 and transmit said address 107 to the slave communication device 103 via the signal line 109. The address 107 can be stored in an address field of the slave communication device 103.

The communication system 100 can be a Local Interconnect Network (LIN), wherein the signal line 109 can be configured as a single wire, and the master communication device 101 and the slave communication device 103 can be bidirectionally connected to one another via the signal line 109.

Figure 2:
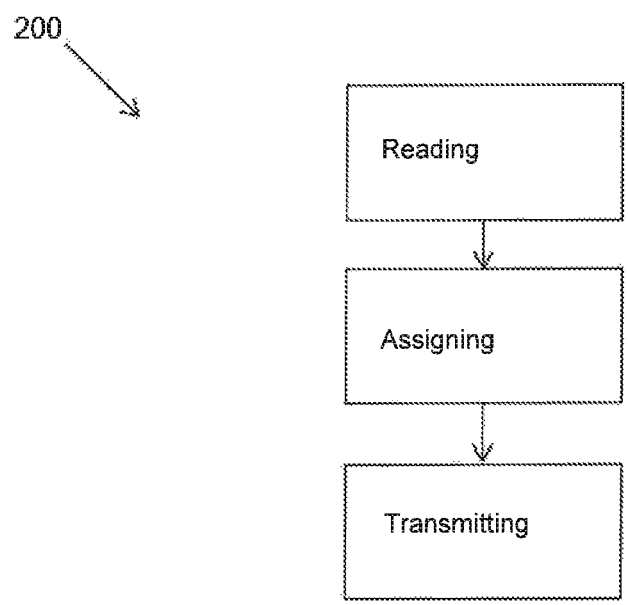
FIG. 2 shows a communication method according to an example.

FIG. 2 shows a schematic illustration of a method 200 for serial communication between the master communication device 101 and the at least one slave communication device 103, wherein the master communication device 101 and the at least one slave communication device 103 are connected to one another for communicating via the signal line 109, wherein the at least one slave communication device 103 has a unique identifier 105, comprising the following steps: reading at least a part of the unique identifier 105 of the slave communication device 103 via the signal line 109, assigning an address 107 to the at least one slave communication device 103 based on at least a part of the unique identifier 105, and transmitting said address 107 to the slave communication device 103 via the signal line 109.

Figure 3:
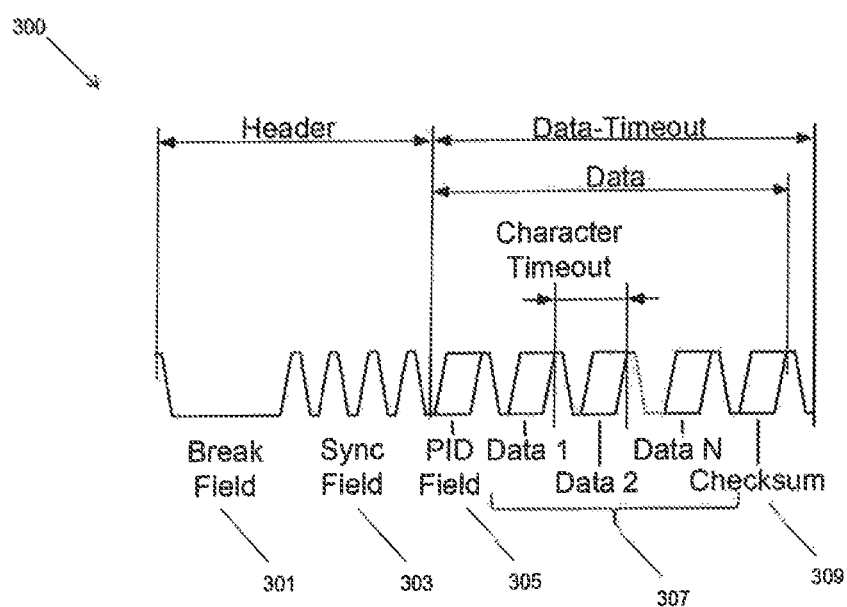
FIG. 3 shows a signal sequence of a message in the signal line according to an example.

FIG. 3 schematically shows a signal sequence of a message in the signal line 109 according to an example.

The messages that can be sent from the master and/or the slave communication devices 101, 103 via the signal line 109 can be realised in accordance with ISO/OSI levels 1 and 2 of the LIN standard, Revision 2.1. Up to 8 bytes of useful data, which are embedded in a protocol frame 300, can be transmitted in one message. Such a protocol frame 300 consists of a break field 301, which has a low signal level and a temporal length of at least 13 bits; a sync field 303, which transmits the string 0x55 (0b01010101) in order to realise the synchronisation of a receiver circuit in the master and/or the slave communication devices, in particular a phase-locked loop (PILL); a protected ID-field (PID), which, on the rear 6 bits, contains the address 107 of the master and/or the slave communication device 101, 103 determined to be the recipient of the message, so that maximally 64 master and/ or slave communication devices can he addressed (the remaining front 2 bits contain parity information (parity bits) to ensure that the address 107 has been transmitted without error); a data field 307, which contains up to 8 bytes of useful data; the checksum 309, which is a 1 byte long checksum entry of bytes contained in the data field 307.

According to the LIN standard, the addresses 60 (0×3C) to 63 (0×3F) can be reserved for protocol internal purposes, so that the addresses 0 to 59 can be used for addressing the master and/or the slave communication devices 101, 103. In total, therefore, 60 master and/or slave communication devices 101, 103 can be uniquely addressed in the LIN system 100.

In one example, an address assignment to the at least one slave communication device 103 in the communication system 100, in particular a LIN system, can be implemented without additional circuits or additional signal access. This achieves the advantage that the address assignment to the master and/or the slave communication devices 101, 103 can be realised in a particularly user-friendly and production-efficient manner, in particular automatically.

Figure 4:
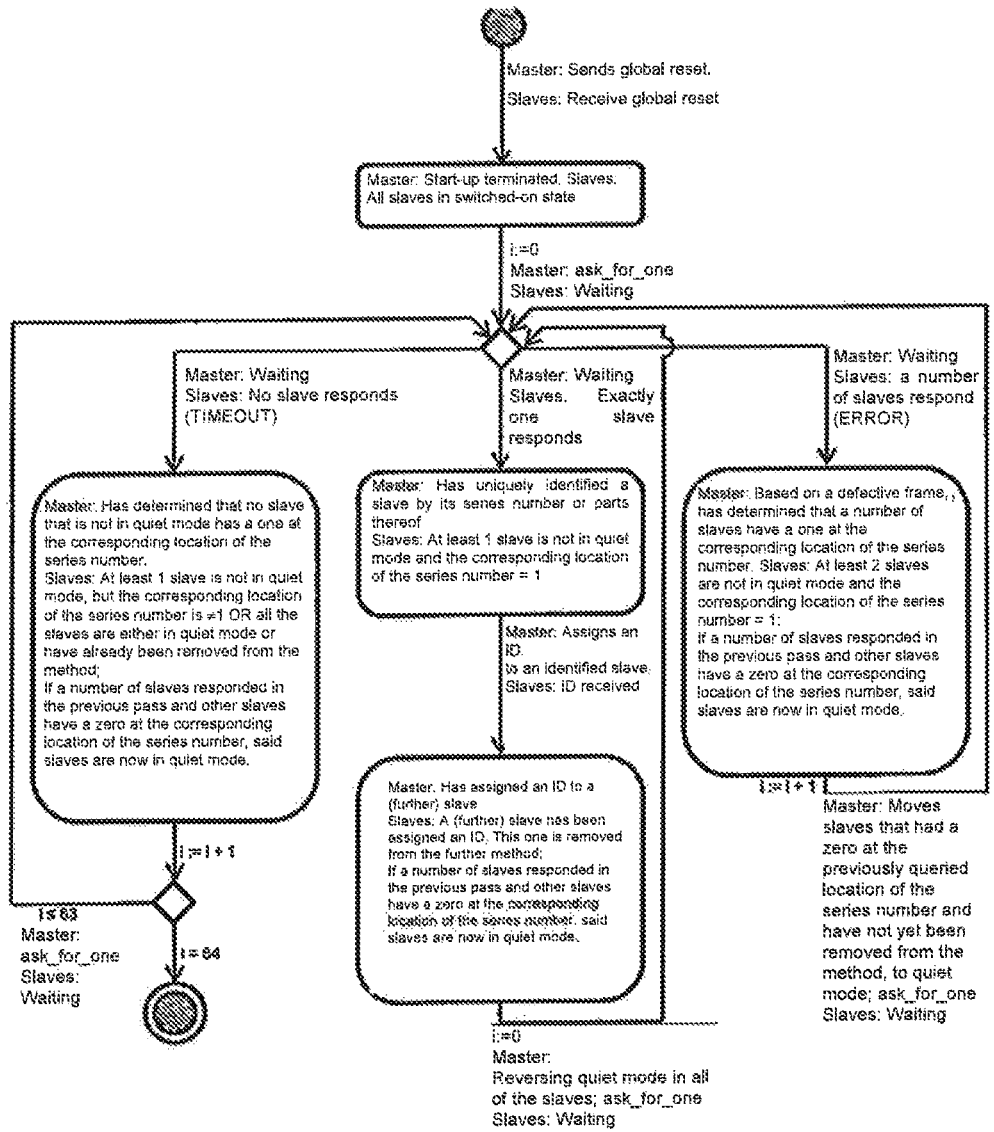
FIG. 4 shows a communication method according to an example

FIG. 4 schematically shows a block diagram of the method for serial communication between the master communication device 101 and the at least one slave communication device 103 according to an example. The master communication device 101 and the at least one slave communication device 103 send messages, in particular query, response and/or status messages, in order to assign an address 107 to the at least one slave communication device 103 on the basis of the respective unique identifiers 105 of the slave communication devices 103.

The address 107 is read from a received message by the master and/or slave communication devices 101, 103 before further contents of the message are processed. The address 107 can be used to initiate asynchronous, global services directed toward all of the master and/or slave communication devices 101, 103.

According to an example, the querying of a specific character at a specific position of the string of the unique identifier 105 of the master and/or the slave communication devices 101, 103 is a global service. The aforementioned global services can already be understood by the master and/or the slave communication devices 101, 103 directly after the master and/or the slave communication devices 101, 103 have been switched on.

According to the example shown in FIG. 4, this query is implemented by querying the same character at different positions. The unique identifier 105 is realised as a binary string, so that the query checks whether a 1 is present at a specific position of the unique identifier 105 of the respective master and/or slave communication devices 101, 103. In subsequent queries, the specific position can be shifted by one position in the character string and can begin with the first digit of the unique identifier 105, The address assignment in the method which uses the above-mentioned global service to query a 1 at a predetermined position of the string of the unique identifier 105, which is stored in binary form in the at least one slave communication device 103, will be described in the following. The master communication device 101 sends a query message to all of the slave communication devices 103, wherein the query message is an ask-for-one message containing a specific position with which the master communication device 101 queries whether a 1 is present at the specific position of the string of the unique identifier 105. After the restart message 401, the master communication device 101 first sends an ask-for-one-message which queries whether a 1 is present at the first position of the character string of the unique identifier 105. Subsequent ask-for-one messages of the master communication device 101 sequentially query the positions of the character string of the unique identifier 105 following the first position.

If the master communication device 101 sends an ask-for-one message, one of the following three possible situations will occur:

None of the plurality of slave communication devices 103 has a 1 at the queried position, so that no slave communication device 103 sends a response message. After a specific amount of time (time out), the master communication device 101 sends another query message with a subsequent position.

Exactly one slave communication device 103 of the plurality of slave communication devices 103 has a 1 at the queried position, so that this slave communication device 103 sends a response message. The master then sends an address assignment message, which contains the address 107 to be assigned in the Protected ID-field (PID), for example, and the unique identifier 105 in the data field, wherein the address assignment message is formed according to the example described in FIG. 3. After receiving said message, the exactly one slave communication device 103 stores the address 107 in the address field of the exactly one slave communication device 103 and no longer responds to subsequent query messages of the master communication device 101.

A number of slave communication devices 103 of the plurality of slave communication devices 103 have a 1 at the queried position, so that said number of slave communication devices 103 send a response message. The signal line 109 has a zero dominance, so that the response messages of the number of slave communication devices 103 generate a defective message. The defective message has a faulty checksum, which cannot be associated with the content of the message. This faulty checksum is evaluated by the master communication device 101, so that the master communication device 101 recognises that a number of slave communication devices 103 of the plurality of slave communication devices 103 have sent a response message.

A further number of slave communication devices 103 of the plurality of slave communication devices 103, which have not responded to the ask-for-one message from the master communication device 101 and correspondingly have a 0 at the query position, are moved to the second operating state by the master communication device 101, so that said further number of slave communication devices 103 no longer respond to subsequent query messages from the master communication device 101. The second operating state of the at least one slave communication device 103 can in particular he a quiet mode.

The quiet mode of the slave communication device 103 is switched via one or two bits in the byte which, according to the example shown in FIG. 3, also contains the 6 bits that include the query position of the unique identifier 105.

If all of the slave communication devices 103 have been assigned an address 107, no further slave communication device 103 sends a response message in a further cycle of the method, and the method is terminated after a certain amount of time (time out). With this final method cycle, it can additionally be ensured that slave communication devices 103, which have not been addressed due to transmission errors, can now send a response message and be addressed.

LIST OF REFERENCE NUMBERS

100 Communication system
101 Master communication device

103 Slave communication device
105 Unique identifier
107 Address
109 Signal line
111 Query message
113 Response message
200 Method
300 Protocol frame
301 Break field
303 Sync field
305 PID field
307 Data field
309 Checksum
401 Restart message

The invention claimed is:

1. A communication system for serial communication, comprising:
a master communication device; and
at least one slave communication device comprising a unique identifier, wherein the master communication device is connected to the at least one slave communication device via a signal line configured for communications, wherein the master communication device is configured to read at least a part of the unique identifier via the signal line, and assign an address to the at least one slave communication device based at least in part on the unique identifier, and transmit the address to the at least one slave communication device via the signal line;
wherein the unique identifier is a string comprising a plurality of characters, wherein the master communication device is configured to query a specific character of the plurality of characters at a specific position in the string by sending a query message to the at least one slave communication device via the signal line.

2. The communication system according to claim 1, wherein the communication system is a Local Interconnect Network (LIN), wherein the signal line is configured as a single wire, and wherein the master communication device and the at least one slave communication device are bidirectionally connected to one another via the signal line.

3. The communication system according to claim 1, wherein the at least one slave communication device is configured to process the query message of the master communication device and confirm that the specific character is present at the specific position in the string of the unique identifier of the at least one slave communication device by sending a response message via the signal line.

4. The communication system according to claim 3, wherein the communication system comprises a plurality of slave communication devices and, based on the response message received by the master communication device, the master communication device is configured to determine whether a single slave communication device, or no slave communication device, or more than one slave communication device of the plurality of slave communication devices sent a response message.

5. The communication system according to claim 3, wherein the at least one slave communication device comprises:
a first operating state, wherein the at least one slave communication device, in the first operating state, is configured to send the response message in response to the query message of the master communication device;
a second operating state;
a third operating state, wherein the at least one slave communication device, in the second operating state and in the third operating state, is configured not send a response message, or refrain from sending the response message, in response to the query message of the master communication device; and
wherein, in the third operating state, the address is assigned to the at least one slave communication device.

6. The communication system according to claim 5, wherein the master communication device is configured to move the at least one slave communication device to the first operating state, the second operating state, or the third operating state by sending a status message via the signal line.

7. The communication system according to claim 5, wherein the master communication device is configured to trigger a restart of the at least one slave communication device by sending a restart message via the signal line, wherein the address in the at least one slave communication device is deleted by the restart, and the at least one slave communication device is moved from the third operating state to the first operating state based at least in part on the restart message.

8. The communication system according to claim 1, wherein the unique identifier is a permanent binary identifier.

9. A method for serial communication, via a signal line, between a master communication device and at least one slave communication device comprising a unique identifier, comprising:
reading, at the master communication device, at least a part of the unique identifier of the at least one slave communication device via the signal line, wherein the unique identifier is a string comprising a plurality of characters;
assigning an address to the at least one slave communication device based at least in part on at least a part of the unique identifier;
transmitting the address to the at least one slave communication device via the signal line; and
sending, from the master communication device to the at least one slave communication device via the signal line, a query message comprising a character and a query position of the character in the string of the unique identifier.

10. The method according to claim 9, further comprising:
sending a restart message from the master communication device to the at least one slave communication device via the signal line, wherein the address assigned to the at least one slave communication device is deleted and the at least one slave communication device is moved from a third operating state in which the at least one slave communication device refrains from responding to the query message to a first operating state in which the at least one slave communication device is configured to respond to the query message, wherein moving to the first operating state is based at least in part on the restart message.

11. The method according to claim 9, further comprising:
sending, from the at least one slave communication device to the master communication device via the signal line, a response message when the character matches the character of the unique identifier at the query position in the string of the unique identifier;
sending, from the master communication device via the signal line to all slave communication devices that did not send a response message to the query message, a status message that causes all of the slave communication devices that did not send the response message to go into a sleep mode and no longer respond to messages from the master communication device; and assigning the address by the master communication device to a first slave communication device when only the first slave communication device responds, wherein the first slave communication device does not take part in the method further and is moved to a third operating state.

12. The method according to claim 11, further comprising:

terminating the method when all positions of the string have been queried and no slave communication device has responded during the query message, wherein the address is assigned to all of the slave communication devices and all of the slave communication devices have been moved to the third operating state.

13. The method according to claim 9, wherein all messages are transmitted digitally and comprise 8 bytes of useful data and a checksum comprising 1 byte.

14. The method according to claim 13, wherein the master communication device is configured to determine whether one slave communication device or a plurality of slave communication devices sent a response message based at least in part on the checksum.

15. A non-transitory computer-readable medium storing code for serial communication, the code comprising instructions executable by a processor to:

read, at a master communication device, at least a part of a unique identifier of at least one slave communication device via a signal line, wherein the unique identifier is a string comprising a plurality of characters;

assign an address to the at least one slave communication device based at least in part on at least a part of the unique identifier;

transmit the address to the at least one slave communication device via the signal line; and send, from the master communication device to the at least one slave communication device via the signal line, a query message comprising a character and a query position of the character in the string of the unique identifier.

16. The non-transitory computer-readable medium according to claim 15, wherein the instructions are further executable to:

send a restart message from the master communication device to the at least one slave communication device via the signal line, wherein the address assigned to the at least one slave communication device is deleted and the at least one slave communication device is moved from a third operating state in which the at least one slave communication device refrains from responding to the query message to a first operating state in which the at least one slave communication device is configured to respond to the query message, wherein moving to the first operating state is based at least in part on the restart message.

17. The method according to claim 11, wherein the sending of the query message, the response message, and the status message are repeated with another character of the unique identifier at another query position until only one slave communication device or no slave communication device sends the response message to the master communication device.

18. The method according to claim 11, further comprising:

determining, at the master communication device after a predetermined time elapses, that no slave communication device sent the response message, wherein the sending of the query message, the response message, and the status message are repeated with another character at another position in the string as long as not all the positions of the string have been queried, without sending a restart message.

19. The method according to claim 11, wherein the sending of the query message, the response message, and the status message, and the assigning the address are repeated without deleting the assigned address and without the participation of those slave communication devices that have already been assigned the address, until the address is assigned to each of the slave communication devices.

* * * * *